(12) United States Patent
Wells et al.

(10) Patent No.: US 9,367,114 B2
(45) Date of Patent: Jun. 14, 2016

(54) CONTROLLING OPERATING VOLTAGE OF A PROCESSOR

(71) Applicant: Intel Corporation, Santa Clara, CA (US)

(72) Inventors: Ryan D. Wells, Folsom, CA (US); Itai Feit, Herzeliya (IL); Doron Rajwan, Rishon Le-Zion (IL); Nadav Shulman, Tel Mond (IL); Zeev Offen, Folsom, CA (US); Inder M. Sodhi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 442 days.

(21) Appl. No.: 13/793,037

(22) Filed: Mar. 11, 2013

(65) Prior Publication Data

US 2014/0258760 A1 Sep. 11, 2014

(51) Int. Cl.
*G06F 1/26* (2006.01)
*G06F 1/32* (2006.01)

(52) U.S. Cl.
CPC .............. *G06F 1/3206* (2013.01); *G06F 1/324* (2013.01); *Y02B 60/1217* (2013.01)

(58) Field of Classification Search
CPC ............... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | |
|---|---|---|---|
| 5,163,153 A | 11/1992 | Cole et al. | |
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,337,595 B1 * | 1/2002 | Hsu et al. | 327/538 |
| 6,441,590 B1 * | 8/2002 | Amantea et al. | 323/266 |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |

(Continued)

FOREIGN PATENT DOCUMENTS

EP  1 282 030 A1  5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Thomas Lee
*Assistant Examiner* — Mohammad A Rahman
(74) *Attorney, Agent, or Firm* — Trop, Pruner & Hu, P.C.

(57) ABSTRACT

In an embodiment, a processor includes a core domain with a plurality of cores and a power controller having a first logic to receive a first request to increase an operating voltage of a first core of the core domain to a second voltage, to instruct a voltage regulator to increase the operating voltage to an interim voltage, and to thereafter instruct the voltage regulator to increase the operating voltage to the second voltage. Other embodiments are described and claimed.

16 Claims, 10 Drawing Sheets

(56) References Cited

U.S. PATENT DOCUMENTS

| | | | |
|---|---|---|---|
| 7,194,643 B2 | 3/2007 | Gonzalez et al. | |
| 7,272,730 B1 | 9/2007 | Acquaviva et al. | |
| 7,346,791 B2* | 3/2008 | Kato et al. | 713/322 |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 8,390,559 B2* | 3/2013 | Moriyama | G09G 3/20 345/204 |
| 8,935,546 B2* | 1/2015 | Gunther | G06F 1/20 713/300 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0019442 A1* | 1/2007 | Li et al. | 363/15 |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0154090 A1 | 6/2011 | Dixon et al. | |
| 2011/0285366 A1* | 11/2011 | Huang et al. | 323/282 |
| 2011/0289335 A1* | 11/2011 | Lipiansky | G06F 1/26 713/340 |
| 2012/0079290 A1 | 3/2012 | Kumar | |
| 2012/0246506 A1 | 9/2012 | Knight | |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/247,564, filed Sep. 28, 2011, entitled, "Estimating Temperature of a Processor Core in a Low Power State ", by Avinash N. Ananthakrishnan, et al.

U.S. Appl. No. 13/282,896, filed Oct. 27, 2011, entitled, "Enabling a Non-Core Domain to Control Memory Bandwidth ", by Avinash N. Ananthakrishnan, et al.

U.S. Appl. No. 13/282,947, filed Oct. 27, 2011, entitled, "Controlling Operating Frequency of a Core Domain Via a Non-Core Domain of a Multi-Domain Processor ", by Avinash N. Ananthakrishnan, et al.

U.S. Appl. No. 13/285,414, filed Oct. 31, 2011, entitled, "Controlling a Turbo Mode Frequency of a Processor," by Avinash N. Ananthakrishnan, et al.

U.S. Appl. No. 13/247,580, filed Sep. 28, 2011, entitled, "Controlling Temperature of Multiple Domains of a Multi-Domain Processor," by Avinash N. Ananthakrishnan, et al.

U.S. Appl. No. 13/285,465, filed Oct. 31, 2011, entitled, "Dynamically Controlling Cache Size to Maximize Energy Efficiency," by Avinash N. Ananthakrishnan, et al.

U.S. Appl. No. 13/225,677, filed Sep. 6, 2011, entitled, "Dynamically Allocating a Power Budget Over Multiple Domains of a Processor," by Avinash N. Ananthakrishnan, et al.

U.S. Appl. No. 13/600,568, filed Aug. 31, 2012, entitled, "Configuring Power Management Functionality in a Processor," by Malini K. Bhandaru, et al.

* cited by examiner

CONTROLLING OPERATING VOLTAGE OF A PROCESSOR

FIELD OF INVENTION

Embodiments relate to power management of a system, and more particularly to operating voltage control in a processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

Dynamic loadline handling optimizes operational voltages by dynamically adjusting an operating voltage based on the worst case current draw for a particular configuration. From a transition ordering perspective, a voltage increase is required for a core or other processor logic to exit a low power state, because an extra core being awake means higher worst case current (even though the voltage required at the gate has not increased). The result of this requirement is that low power state exits cannot proceed ahead of voltage increases from an ordering perspective. However, in certain situations, such as where a large voltage increase is under way, the low power state exit be undesirably delayed.

DETAILED DESCRIPTION

In various embodiments, voltage transitions within a processor may be segmented into two or more segments. In an embodiment, a dispatcher or other control logic of the processor may controllably cause such multi-phase voltage ramps. In operation, a first segment is a transition to an interim or safe voltage level, which is at a sufficient voltage level to cover all active agents (and at least one additional agent) running at a lower frequency in a particular transition. Any additional voltage increase to enable a pending frequency increase requested for one or more of the agents is handled in a second segment of the transition, which can occur after a low power state exit of the additional agent. Using such an embodiment, the worst case voltage ramp incurred before a low power state exit may be a worst case load line adder (e.g., 50 millivolts (mV)), rather than a full scale voltage range (e.g., from a minimum operating voltage to a maximum operating voltage, which for example may be 400 mV). In this way, a reduced latency for allowing an agent to exit a low power state may be realized.

Figure 1:
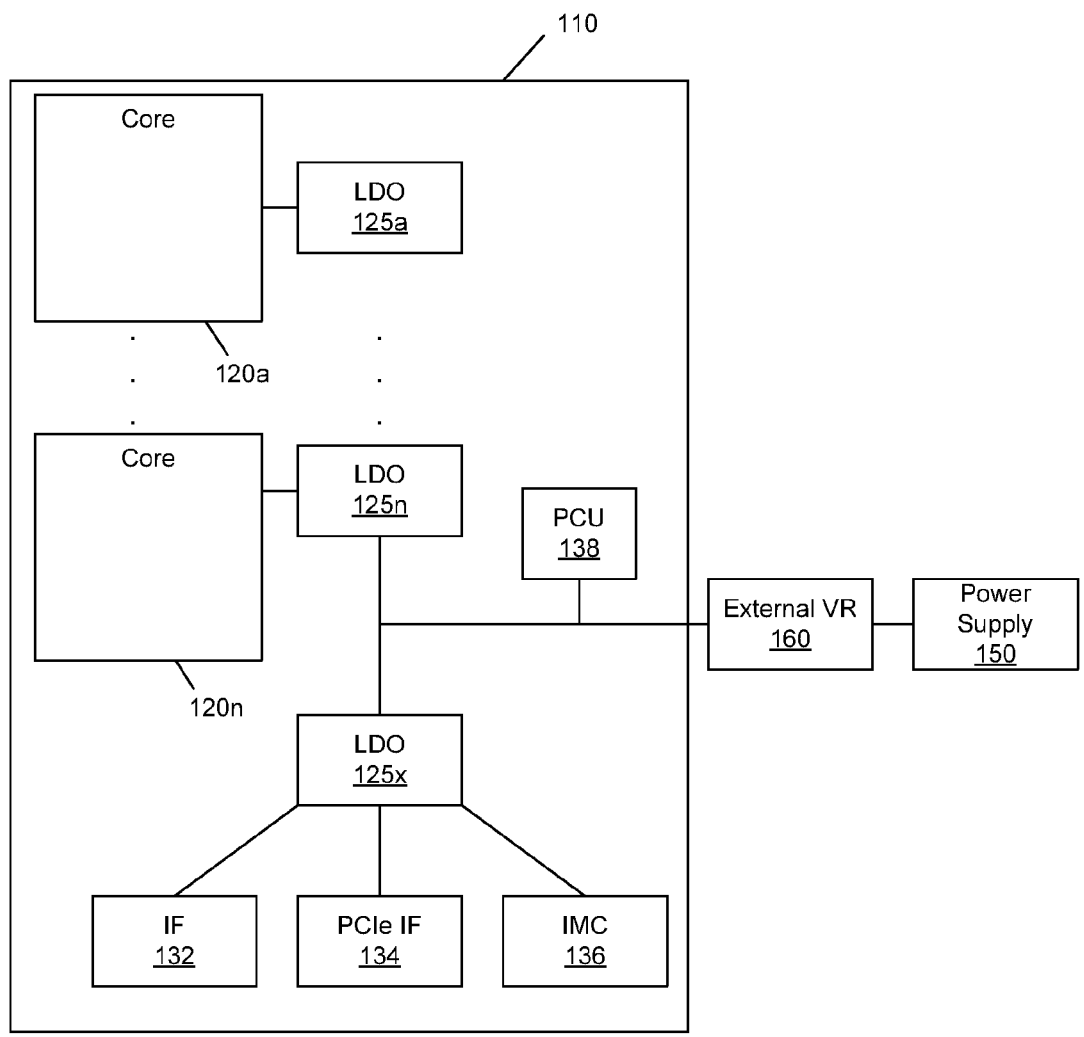
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor socket including multiple core units 120a-120n. In an embodiment, each core unit may include multiple cores, a cache memory, an interface unit and so forth. In addition, each core may be associated with an individual low dropout regulator (LDO) 125a-125n to allow for fine-grained control of voltage and thus power and performance of each individual core unit. In an embodiment, the LDOs may be controlled in a first mode to be engaged to further regulate voltages provided to a core, or in a second mode to be bypassed such that the received external voltage is bypassed without further regulation. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another LDO 125x. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to perform multiple sequencing operations to update an operating voltage to enable faster agent wakeups in accordance with an embodiment of the present invention. Furthermore, PCU 138 may be coupled via a dedicated interface to external voltage regulator 160. In this way, PCU 138 can instruct the voltage regulator to provide a requested regulated voltage to the processor. While not shown for ease of illustration, understand that additional components may be present within processor 110 such as additional uncore logic and other components such as internal memories, e.g., one or more levels of a cache memory hierarchy and so forth.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the voltage control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency, exceeding to a maximum peak frequency of the particular processor, as fused or otherwise written into the processor during manufacture. In addition, according to ACPI, a processor can operate at various power states or levels. With regard to power states, ACPI specifies different activity or power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 2:
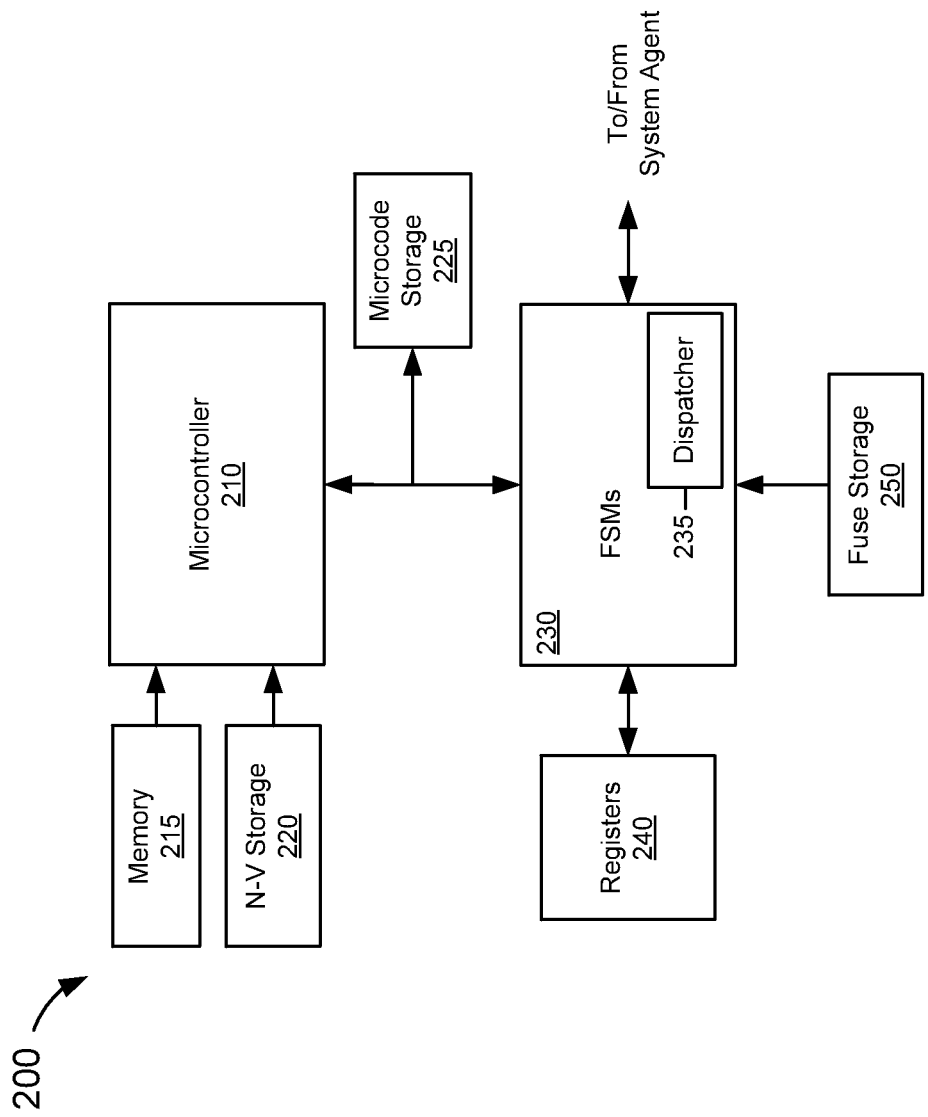
FIG. 2 is a block diagram of a power control unit in accordance with an embodiment of the present invention.

Referring now to FIG. 2, shown is a block diagram of a PCU in accordance with an embodiment of the present invention. In general, PCU 200 may be configured using a combination of hardware, firmware and software to enable power management operations for the processor based on information received from various sources. In an embodiment, these sources include instructions from system software (such as an OS, basic input/output system (BIOS) or application software), configuration information, e.g., received from configuration storages of the processor such as one or more non-volatile storages, fuses or the like, among other information. As seen, the primary computing engine of the PCU is a microcontroller 210. Microcontroller is coupled to a memory 215 which in an embodiment may be a volatile memory such as a given random access memory (RAM). Also, microcontroller 210 is coupled to a non-volatile storage 220 which in an embodiment can be a read only memory (ROM) that may include program instructions, configuration information and so forth.

As further seen in FIG. 2, microcontroller 210 is coupled to a microcode storage 225 which may store microcode that executes on microcontroller 210. In an embodiment, this microcode may include so-called power code (Pcode) to execute on microcontroller 210 to handle power management functions based on various inputs.

To further enable power management operations to take effect, microcontroller 210 is coupled to one or more hardware finite state machines (FSMs) 230. Although the scope of the present invention is not limited in this regard in an embodiment multiple such FSMs may be present, each of which is configured to handle various operations. In connection with execution of the FSMs, a set of registers 240 is coupled to the FSMs. One example FSM shown in FIG. 2 is a dispatcher 235 which may be used to dispatch power management operations responsive to instructions received from microcontroller 210. Stated another way, dispatcher 235 is configured to determine and schedule appropriate actions to occur responsive to the instructions received from microcontroller 210.

In embodiments described herein, dispatcher 235 may be configured as a pre-emptible state machine. That is, the state machine may be configured such that while underlying operations are underway within the processor responsive to dispatched instructions from the state machine (as the state machine traverses from a first state to a second state), one or more new instructions may be received from microcontroller 210 that cause a different flow of operation of the state machine. This may lead to a set of one or more transitions that occur within the state machine without the previous transition being completed. For example, on receipt of a new instruction, the state machine may begin again from its initial state. By using a pre-emptible state machine as described herein, embodiments may enable wakeup operations such as a wakeup of a core or other IP logic block in a low power state to occur with lower latency.

Still referring to FIG. 2, for at least some of the operations performed within FSMs 230, various configuration information of the processor obtained from a fuse storage 250 may be provided. For example, this information may include operating voltage information such as a set of operating voltages each associated with a given level of operation of the processor (e.g., dependent on the number of active cores, core frequencies and so forth). Although shown at this location in the embodiment of FIG. 2, in another embodiment this fuse storage may be located in a fabric coupled to the PCU. As shown in FIG. 2, FSMs 230 also enable an interface between PCU 200 and other components of a processor. For example, this interface may interconnect via a system agent circuit of the processor to enable communication with other appropriate entities such as voltage regulator modules and other power delivery components, among other portions of a processor. Although shown at this high level in the embodiment of FIG. 2, understand the scope of the present invention is not limited in this regard.

Figure 3:
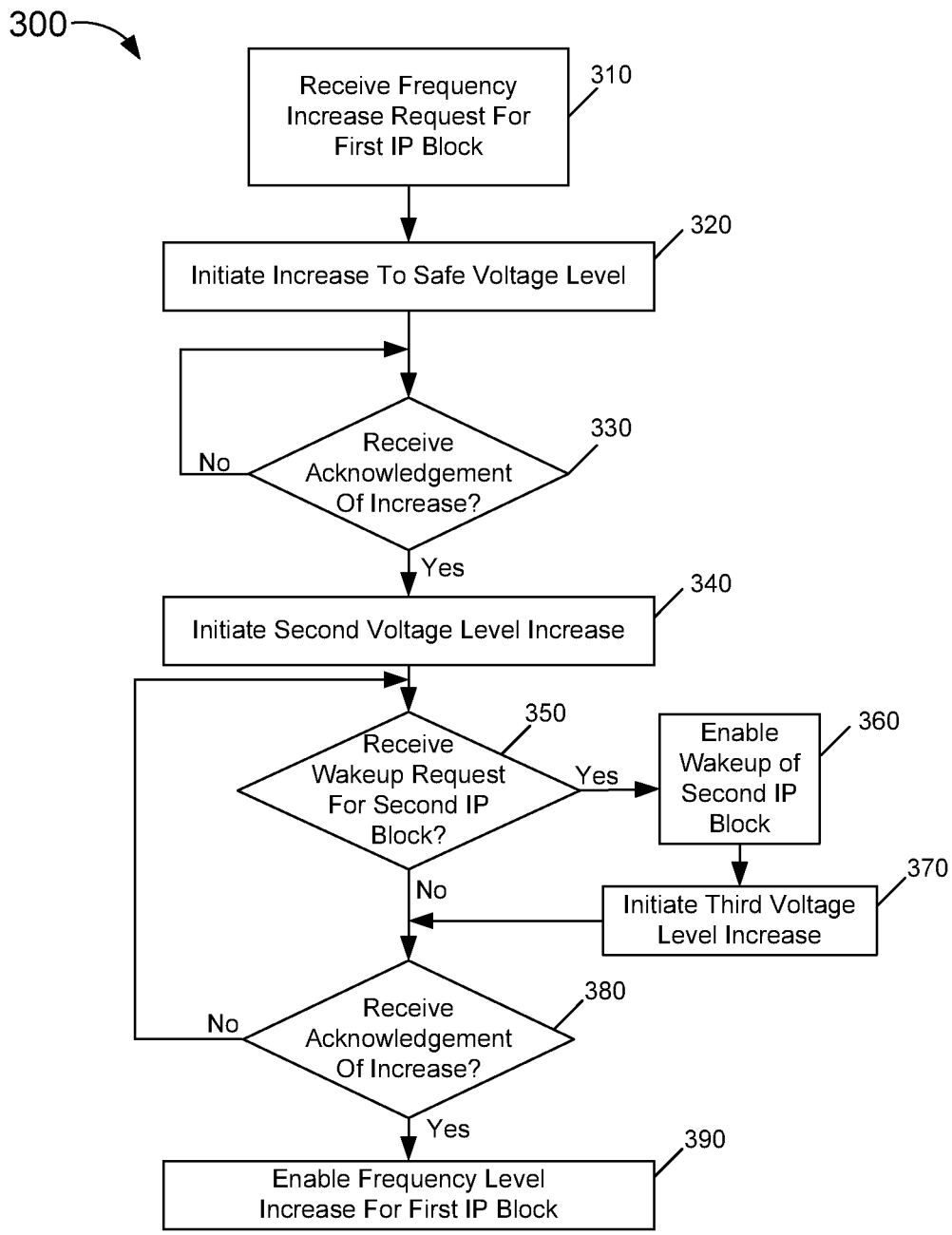
FIG. 3 is a flow diagram of a method for controlling operating voltage of a processor in accordance with an embodiment of the present invention.

Referring now to FIG. 3, shown is a flow diagram of a method for controlling operating voltage of a processor in accordance with an embodiment of the present invention. As shown in FIG. 3, method 300 may be performed by various hardware, software and/or firmware of a processor. In an embodiment, method 300 may be performed within a PCU which may include a microcontroller and one or more FSMs as discussed above with regard to FIG. 2. As seen in FIG. 3, method 300 begins by receiving a frequency increase request (block 310). In an embodiment, this frequency increase request may be received from the OS which may request that a first IP block, e.g., a single core of the multicore processor, have its frequency increased to a turbo mode frequency, e.g., corresponding to a P0 performance state. For purposes of discussion assume that the core is currently operating at a lower performance state, a Pn performance state. And further for purposes of discussion assume that only this single core of the multicore processor is in an active state. In other words, one or more other cores of the processor are in a so-called C-state or low power state.

In a particular embodiment, this frequency increase request may be received within a microcontroller of the PCU that executes power control firmware. Still referring to FIG. 3, next control passes to block 320 where the power controller can initiate an increase to a safe voltage level (block 320). Here it can be assumed that the microcontroller has determined that available headroom exists in the processor to enable the requested frequency to increase. As such, the microcontroller may instruct the dispatcher of the PCU to initiate this increase to a safe voltage level. More specifically, the dispatcher may determine an appropriate voltage level to support the increase in frequency, based on the number of active cores, the frequency or performance state of these cores and fused information of the processor such as the appropriate voltage level.

Note however in the embodiment of FIG. 3, rather than performing a single request to cause the voltage increase to the appropriate level for handling the increased frequency request, instead an increase to a safe voltage is initiated. As used herein, the term "safe voltage" means a voltage level at which at least one additional IP logic block (such as a core) may be safely powered up from a low power state.

Still referring to FIG. 3, control passes to diamond 330 where it can be determined whether an acknowledgement of this increase to the safe voltage level has been received. In an embodiment, this determination may be made by the dispatcher itself which receives an indication from the voltage regulator that the requested safe voltage level has been attained. Responsive to this acknowledgement, control passes next to block 340 where an increase to a second, higher voltage level may be initiated. In an embodiment, this initiation may be responsive to an instruction from the dispatcher to the voltage regulator module to thus raise the operating voltage to an appropriate level to allow a single core to enter into a higher performance state (e.g., a turbo mode frequency). Thus as illustrated in FIG. 3, a multi-level voltage ramp process occurs such that the operating voltage is first increased to a safe voltage level and thereafter upon successful acknowledgment of attainment of that safe voltage level, an additional operating voltage increase may occur. Note that in various embodiments, the rate or slope of these two different ramps may be at the same or different levels.

As described above, embodiments provide for a pre-emptible state machine. As such, during execution of this voltage ramp, it can be determined whether a wakeup request is received (diamond 350). In an embodiment, this determination may be made by the microcontroller, which may receive an incoming wakeup request, e.g., from an OS to cause a second IP block, e.g., a second core, to exit a low power state and enter into an active state. If such a request is received during this time period after the successful acknowledgement of reaching the safe voltage level, at block 360 this wakeup of the IP block may be enabled without delay. Stated another way, because the dispatcher requested a two-step increase in voltage, first to a safe voltage level and then to a higher voltage level, the dispatcher can confirm that the processor is receiving at least the safe operating voltage. As such, the dispatcher can cause the IP block to be awoken into an active state without delay. Still referring to FIG. 3, because the state machine has been pre-empted and this additional core is now active, to allow the first core to enter into a higher performance state, yet a further voltage increase may be requested. Accordingly as seen in FIG. 3 at block 370 the dispatcher may initiate a third voltage level increase to this higher voltage level.

Still with reference to FIG. 3, control passes next to diamond 380 where it may be determined whether an acknowledgment of the voltage increase has been received. If so, control passes to block 390 where the dispatcher can enable a frequency level increase for the first IP block. Thus as the operating voltage has now settled at the appropriate frequency to be able to handle a turbo mode frequency, the dispatcher may enable the first core to enter into such higher frequency operation otherwise control passes back to diamond 350. Although shown at this high level in the embodiment of FIG. 3, understand the scope of the present invention is not limited in this regard. Note that while shown with a generally linear flow for discussion purposes, in an embodiment wherever a new request is received, control may flow back to the beginning of a state machine, and execution proceeds through the same flow (skipping steps that are not relevant for particular transition).

Figure 4:
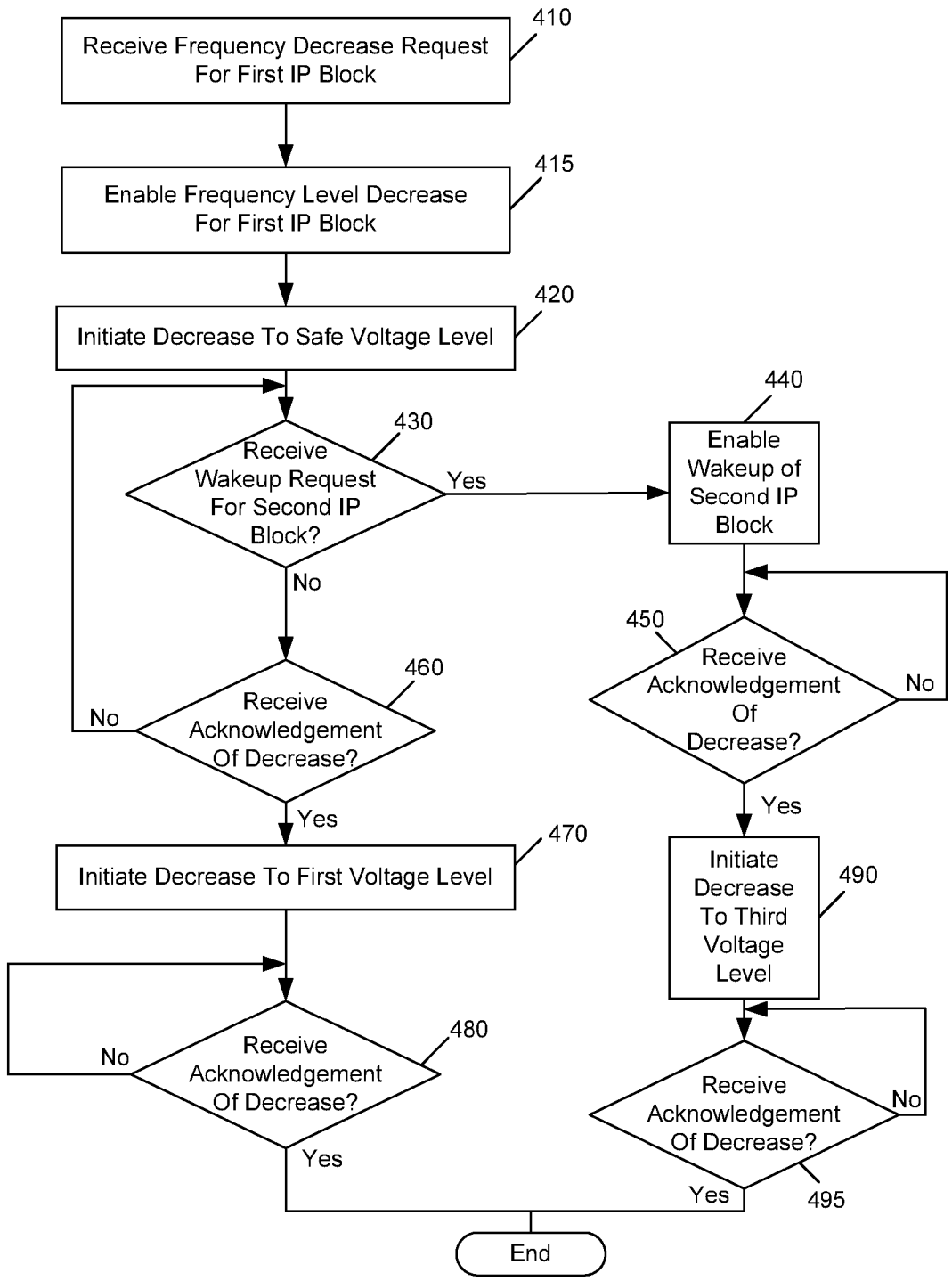
FIG. 4 is a flow diagram of a method for controlling operating voltage of a processor in accordance with another embodiment of the present invention.

Referring now to FIG. 4, shown is a flow diagram of a method for controlling operating voltage of a processor in accordance with another embodiment of the present invention. In an embodiment, method 400 may be performed within a PCU as discussed above. As seen in FIG. 4, method 400 begins by receiving a frequency decrease request (block 410). In an embodiment, this frequency decrease request may be received from the OS which may request that a first IP block, e.g., a single core of the multicore processor, have its frequency decreased, e.g., from a turbo mode frequency (e.g., corresponding to a P0 performance state) to a non-turbo mode frequency, e.g., a Pn performance state. For purposes of discussion assume that only this single core of the multicore processor is in an active state.

In a particular embodiment, this frequency decrease request may be received within a microcontroller of the PCU that executes power control firmware. Still referring to FIG. 4, next control passes to block 415 where the power controller can initiate the performance level decrease. To maintain proper operation, note that this frequency decrease occurs prior to any voltage reduction.

Still referring to FIG. 4, next the microcontroller may instruct the dispatcher of the PCU to initiate a decrease to a safe voltage level (block 420). More specifically, the dispatcher may determine an appropriate voltage level to support both the decrease in frequency and the potential of a core wakeup during the transition. In an embodiment this control may be based on the number of active cores, the frequency or performance state of these cores and fused information of the processor such as the appropriate voltage level.

As described above, embodiments provide for a pre-emptible state machine. As such, during execution of this voltage ramp, it can be determined whether a wakeup request is received (diamond 430). In an embodiment, this determination may be made by the microcontroller, which may receive an incoming wakeup request, e.g., from an OS to cause a second IP block, e.g., a second core, to exit a low power state and enter into an active state.

If no wakeup request is received during the down ramp to the safe operating voltage (as determined at diamond 430), control passes next to diamond 460 where it can be determined whether an acknowledgement of the decrease to the safe voltage level has been received. Otherwise control passes back to diamond 430. If the acknowledgement is received, the dispatcher may initiate a decrease to a first, lower voltage (e.g., sufficient to power a single core at a lower frequency) at block 470. In an embodiment, this initiation may be responsive to an instruction from the dispatcher to the voltage regulator module to thus decrease the operating voltage to an appropriate level to allow single core operation at a lower frequency. Thus as illustrated in FIG. 4, a multi-level voltage ramp process occurs such that the operating voltage is first decreased to a safe voltage level and thereafter upon successful acknowledgment of attainment of that safe voltage level (and no pre-empting request for enabling an additional IP block), an additional operating voltage decrease may occur.

Still with reference to FIG. 4, control passes next to diamond 480 where it may be determined whether an acknowledgment of the voltage decrease has been received. If so, the method may conclude.

If instead at diamond 430 it is determined that a request is received during this time period after the request to lower the operating voltage to a safe voltage level, at block 440 this wakeup of the IP block may be enabled without delay. Stated another way, because the dispatcher requested a decrease in voltage only to a safe voltage level, the dispatcher can confirm that the processor is receiving at least the safe operating voltage. As such, the dispatcher can cause the IP block to be awoken into an active state without delay.

Still referring to FIG. 4, control passes to diamond 450 where it can be determined whether an acknowledgement of this decrease to the safe voltage level has been received. In an embodiment, this determination may be made by the dispatcher itself which receives an indication from the voltage regulator that the requested safe voltage level has been attained. Responsive to this acknowledgement, the dispatcher may initiate a decrease to a third, intermediate voltage between the first voltage level and the safe voltage level (e.g., sufficient to power multiple cores at a lower frequency) at block 490. In an embodiment, this initiation may be responsive to an instruction from the dispatcher to the voltage regulator module to thus decrease the operating voltage to an appropriate level to allow multiple core operation at a lower frequency. Thus as illustrated in FIG. 4, a multi-level voltage ramp process occurs such that the operating voltage is first decreased to a safe voltage level and thereafter upon successful acknowledgment of attainment of that safe voltage level, an additional operating voltage decrease (to an appropriate voltage level based on the remaining number of cores) may occur.

Still with reference to FIG. 4, control passes next to diamond 495 where it may be determined whether an acknowledgment of this additional voltage decrease has been received. If so, the method may conclude. Although shown at this high level in the embodiment of FIG. 4, understand the scope of the present invention is not limited in this regard.

While shown in the above several flow diagrams with particular timing sequences and operations to cause an operating voltage of one or more cores of a processor to be increased or decreased, understand that other situations are possible. That is, according to embodiments of the present invention different sequences of incoming requests to a power controller may cause different operations to occur using a multi-level operating voltage ramp control to enable faster guarantee of a safe operating voltage for increasing the number of active cores. Thus although shown with this particular event handling in FIGS. 3 and 4, understand that the logic can handle request wakeups arriving at an arbitrary time, and specific handling changes based on when a request arrives. Furthermore, understand that while the embodiments described herein are with respect to enabling additional cores of a core domain to enter into an active state, the scope of the present invention is not limited in this regard. That is, other processing engines of a graphics domain, one or more image processing engines of a capture device or other IP blocks of a processor may similarly realize the low latency exit from a low power state.

Figure 5:
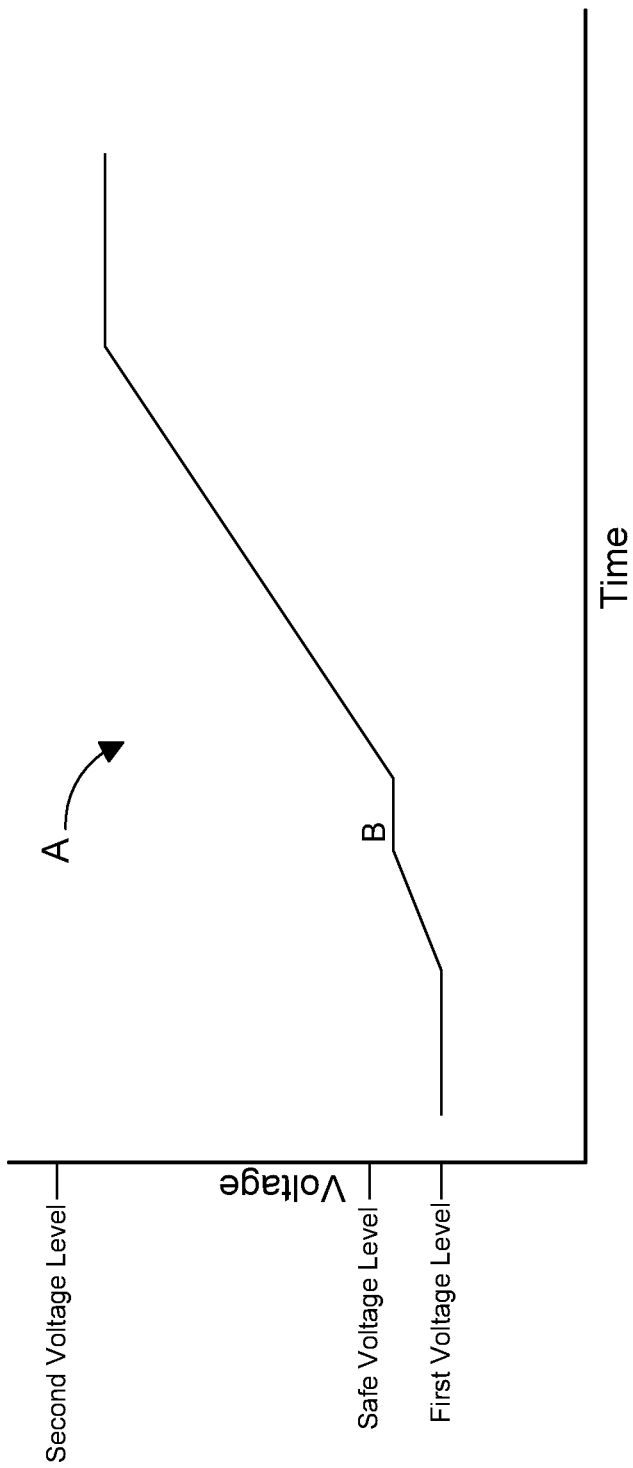
FIG. 5 is a graphical illustration of a multi-level operating voltage ramp profile in accordance with an embodiment of the present invention.

Referring now to FIG. 5, shown is a graphical illustration of a multi-level operating voltage ramp profile in accordance with an embodiment of the present invention. As shown in FIG. 5, a multi-level operating voltage profile A is present. In this example, note that the initial operating voltage is at a first voltage level which in an embodiment may be a minimum operating voltage for the processor, namely a situation in which a single core is operating at a low frequency point (e.g., corresponding to a performance level of Pn). Assume that a request is received for this core to increase its frequency to a higher, e.g., turbo mode frequency (e.g., corresponding to a performance level of P0). To effect such operation, an increase in operating voltage to a higher level may occur. More specifically, the target operating voltage to enable this increase in frequency corresponds to a second voltage level at which one core may operate at a high frequency.

However note that instead of making a single request to a voltage regulator to cause a smooth ramp up to this voltage, a request is made to increase the operating voltage to a safe operating voltage, shown at point B, in FIG. 5. Note that this safe operating voltage corresponds to an interim voltage level between the first and second voltage levels, at which two cores may operate at a low frequency level. Once acknowledgement of reaching this safe operating voltage is received in the processor (e.g., within the power controller), a request to wakeup another core or other IP block of the processor may be granted without delay, as with this interim, safe operating voltage, an anchor point is thus established such that the power controller can enable both cores to operate at the lower frequency level.

Note that after the acknowledgment is received, a second request is issued from the power controller to the voltage regulator to cause the additional ramp up to the higher operating voltage level to enable turbo mode operation. Although not shown for ease of illustration in FIG. 5, understand that in addition, yet another request can be issued to the voltage regulator to further increase the operating voltage to a third voltage level that accommodates the core operating at a turbo mode frequency as well as the second core operating at a lower frequency. Further although this relatively simplified view is shown in the illustration of FIG. 5, understand that more complicated multi-level operating voltage ramp profiles may be realized using an embodiment of the present invention.

Figure 6:
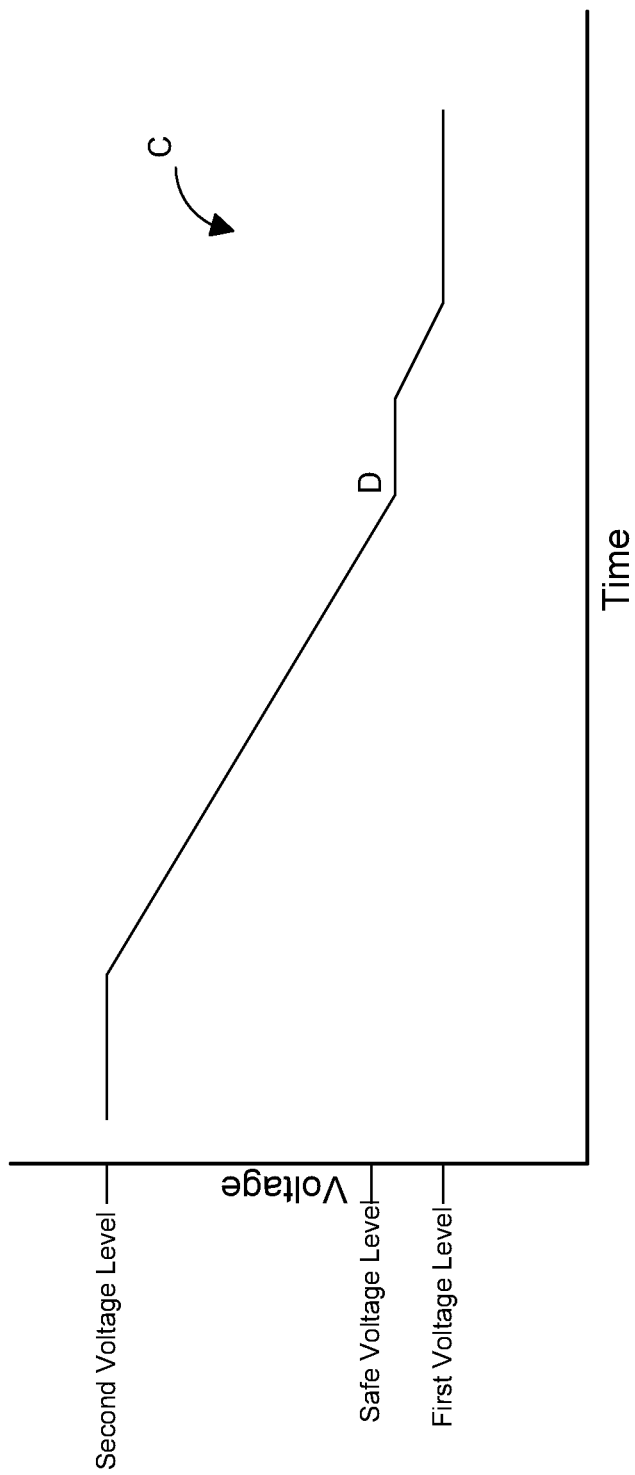
FIG. 6 is a graphical illustration of a multi-level operating voltage ramp profile in accordance with another embodiment of the present invention.

Referring now to FIG. 6, shown is a graphical illustration of a multi-level operating voltage ramp profile in accordance with an embodiment of the present invention. As shown in FIG. 6, a multi-level operating voltage profile C is present. In this example, note that the initial operating voltage is at a second voltage level which in an embodiment may be an operating voltage for the processor sufficient to enable a single core to operate at a high frequency point (e.g., corresponding to a performance level of P0). Assume that a request is received for this core to decrease its frequency to a lower, e.g., non-turbo mode frequency (e.g., corresponding to a performance level of Pn). To effect such operation, after causing the frequency reduction in the core, a decrease in operating voltage to a lower level may occur. More specifically, the target operating voltage for a single core to operate at a lower frequency may be a first voltage level at which one core may operate at a lower frequency.

However note that instead of making a single request to a voltage regulator to cause a smooth ramp down to this voltage, a request is made to decrease the operating voltage to a safe operating voltage, shown at point D, in FIG. 6. Note that this safe operating voltage corresponds to an interim voltage level between the first and second voltage levels, at which two cores may operate at a low frequency level. After initiating this ramp down, a request to wakeup another core or other IP block of the processor may be granted without delay, as with this interim, safe operating voltage guaranteed, an anchor point is thus established such that the power controller can enable both cores to operate at the lower frequency level.

Note that after the acknowledgment of attainment of this safe operating voltage level is received (and assuming no wakeup request has been received), a second request is issued from the power controller to the voltage regulator to cause the additional ramp down to the lower operating voltage level to enable lower frequency mode operation. Although this relatively simplified view is shown in the illustration of FIG. 6, understand that more complicated multi-level operating voltage ramp profiles may be realized using an embodiment of the present invention.

Referring now to Tables 1 and 2, shown are example sequences of operations to perform voltage transitions in accordance with embodiments of the present invention. As seen in these Tables, multiple voltages transition instructions are issued from a dispatcher responsive to requests from a microcontroller to a voltage regulator to guarantee at least a safe operating voltage as described herein. Specifically Table 1 shows operation for an upward transition, and Table 2 shows operation for a downward transition. Each Table shows an input request (to a dispatcher from a microcontroller), an output instruction (to a voltage regulator), and target and status values. Note while shown with particular sequences of operations and specific values, understand the scope of the present invention is not limited in this regard.

In the Tables assume two cores total: low frequency operation is at 1 GHz; high frequency operation is at 3 GHz; at low frequency, headroom for adding a core is +20 mV/core; and headroom for adding a core at high frequency +40 mV/core.

TABLE 1

| Request from Microcontroller | Dispatcher Action | Target Cores | freq | Voltage (mV) | Safe (mV) voltage | Status Cores | Freq | Assumed Voltage (mV) | Actual Voltage (mV) |
|---|---|---|---|---|---|---|---|---|---|
| Initial state | | 1 | 1 | 720 | 740 | 1 | | 720 | 720 |
| Request Frequency Increase | | 1 | 3 | 1040 | 740 | | | | |
| | Ramp voltage to 740 | | | | | | | 720 | 720-740 |
| | Voltage settled from VR | | | | | 1 | | 740 | 740 |
| | Ramp voltage to 1040 | | | | | | | 740 | 740-1040 |
| Request Wakeup | | 2 | 3 | 1080 | 740 | 2 | 1 | 740 | 740-1040 |
| | C-state exit | | | | | | | 740 | 740-1080 |
| | Ramp voltage to 1080 | | | | | | 2 | 1080 | 1080 |
| | Voltage settled from VR | | | | | | | 1080 | 1080 |
| | Freq up | | | | | | | | |

TABLE 2

| Request from Microcontroller | Dispatcher Action | Target cores | freq | Voltage (mV) | Safe (mV) voltage | Status | cores | Freq | Assumed voltage (mV) | Actual voltage (mV) |
|---|---|---|---|---|---|---|---|---|---|---|
| Initial state | | 1 | 3 | 1040 | 1040 | | 1 | 3 | 1040 | 1040 |
| Request Freq decrease | | 1 | 1 | 720 | 740 | | | | | |
| | Freq down | | | | | | 1 | 1 | 1040 | 1040 |
| | Ramp voltage to 740 | | | | | | 1 | 1 | 740 | 740-1040 |
| Request | | 2 | 1 | 740 | 740 | | | | | |

TABLE 2-continued

| Request from Microcontroller | Dispatcher Action | Target cores | freq | Voltage (mV) | Safe (mV) voltage | Status | cores | Freq | Assumed voltage (mV) | Actual voltage (mV) |
|---|---|---|---|---|---|---|---|---|---|---|
| wakeup | | | | | | | | | | |
| | C-state exit | | | | | | 2 | 1 | 740 | 740-1040 |
| | Ramp voltage to 740 | | | | | | 2 | 1 | 740 | 740-1040 |
| | Voltage settled from VR | | | | | | 2 | 1 | 740 | 740 |

Figure 7:
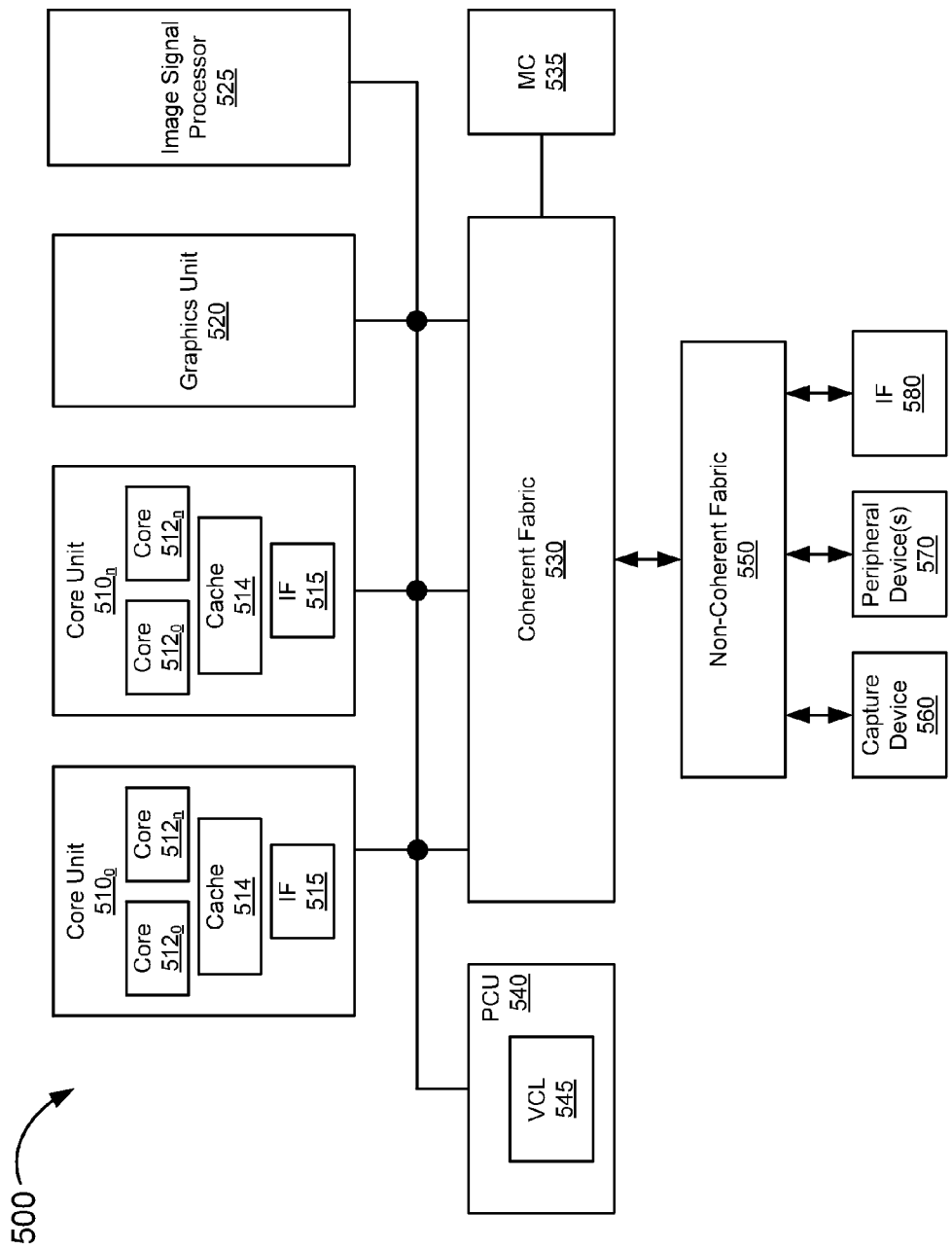
FIG. 7 is a block diagram of a processor in accordance with an embodiment of the present invention.

Embodiments can be implemented in processors for various markets including server processors, desktop processors, mobile processors and so forth. Referring now to FIG. 7, shown is a block diagram of a block diagram of a processor in accordance with an embodiment of the present invention. In the embodiment of FIG. 7, processor 500 may be a system on a chip (SoC) including multiple domains, each of which may be coupled to receive an operating voltage from a separate rail coupled to one or more external voltage regulators. Such SoC may be used in a low power system such as a smartphone, tablet computer, Ultrabook™ or other portable computing device. In addition, although not shown for ease of illustration in FIG. 7, understand that the voltage rails may in turn be coupled to on-chip LDOs that may further condition a regulated voltage to be provided to corresponding logic of the SoC.

In the high level view shown in FIG. 7, processor 500 includes a plurality of core units $510_0$-$510_n$. Each core unit may include one or more processor cores $512_0$-$512_n$. In addition, each such core may be coupled to a cache memory 514 which in an embodiment may be a shared level (L2) cache memory. As further shown, each core unit 510 includes an interface 515 such as a bus interface unit to enable interconnection to additional circuitry of the processor. Specifically as shown, each core unit 510 couples to a coherent fabric 530 that may act as a primary cache coherent on-die interconnect that in turn couples to a memory controller 535. In turn, memory controller 535 controls communications with a memory such as a dynamic random access memory (DRAM) (not shown for ease of illustration in FIG. 7).

In addition to core units, additional processing engines are present within the processor, including at least one graphics unit 520 which may include one or more graphics processing units (GPUs) to perform graphics processing as well as to possibly execute general purpose operations on the graphics processor (so-called GPGPU operation). In addition, at least one image signal processor 525 may be present. Signal processor 525 may be configured to process incoming image data received from one or more capture devices, either internal to the SoC or off-chip.

As seen, all of these various processing units, including core units 510, graphics unit 520 and image signal processor 525 couple to coherent fabric 530. In addition, each of the units may have its power consumption controlled via a power control unit 540. PCU 540 includes a voltage control logic 545 to perform operating voltage transitions according to a multi-level operating voltage ramp profile as described herein. In this way, incoming requests for low power exits can be enabled with little or no latency, as the voltage control logic can guarantee that an incoming rail is at least at a safe operating voltage to enable an additional processing unit to exit a low power state and enter an active state.

As further seen in FIG. 7, coherent fabric 530 couples to a non-coherent fabric 550 to which various peripheral devices may couple. In the embodiment shown in FIG. 7, these devices keep a capture device 560, such as an on-chip camera, one or more peripheral devices 570, and one or more interfaces 580 such as a PCIe™ interface to enable communication with one or more offchip devices, e.g., according to the PCIe™ communication protocol. Although shown at this high level, in the embodiment of FIG. 7, understand the scope of the present invention is not limited in this regard.

Figure 8:
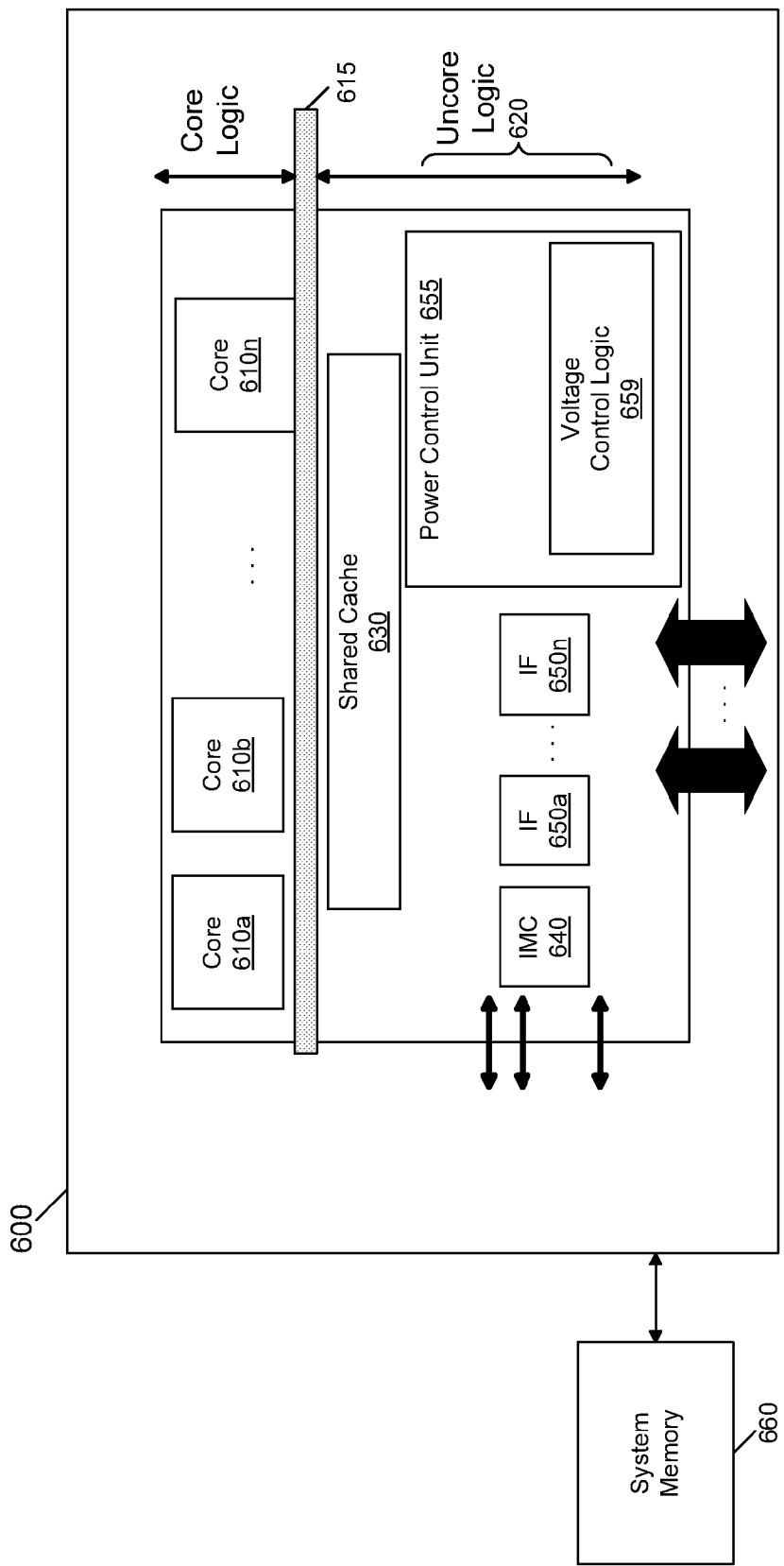
FIG. 8 is a block diagram of a processor in accordance with another embodiment of the present invention.

Referring now to FIG. 8, shown is a block diagram of a processor in accordance with an embodiment of the present invention. As shown in FIG. 8, processor 600 may be a multicore processor including a plurality of cores 610a-610n. In one embodiment, each such core may be of a single domain or an independent power domain and can be configured to enter and exit active states and/or turbo modes based on workload. The various cores may be coupled via an interconnect 615 to a system agent or uncore 620 that includes various components. As seen, the uncore 620 may include a shared cache 630 which may be a last level cache. In addition, the uncore may include an integrated memory controller 640, various interfaces 650 and a power control unit 655.

In various embodiments, power control unit 655 may include a voltage control logic 659 in accordance with an embodiment of the present invention. As described above, this logic is configured to cause operating voltage changes to occur according to a multi-level ramp profile in order to be able to respond to low power exit requests with reduced latency. In some embodiments, such logic may include one or more state machines that are pre-emptible to allow incoming low power exit requests to be handled during execution of an operating voltage level update.

With further reference to FIG. 8, processor 600 may communicate with a system memory 660, e.g., via a memory bus. In addition, by interfaces 650, connection can be made to various off-chip components such as peripheral devices, mass storage and so forth. While shown with this particular implementation in the embodiment of FIG. 8, the scope of the present invention is not limited in this regard.

Figure 9:
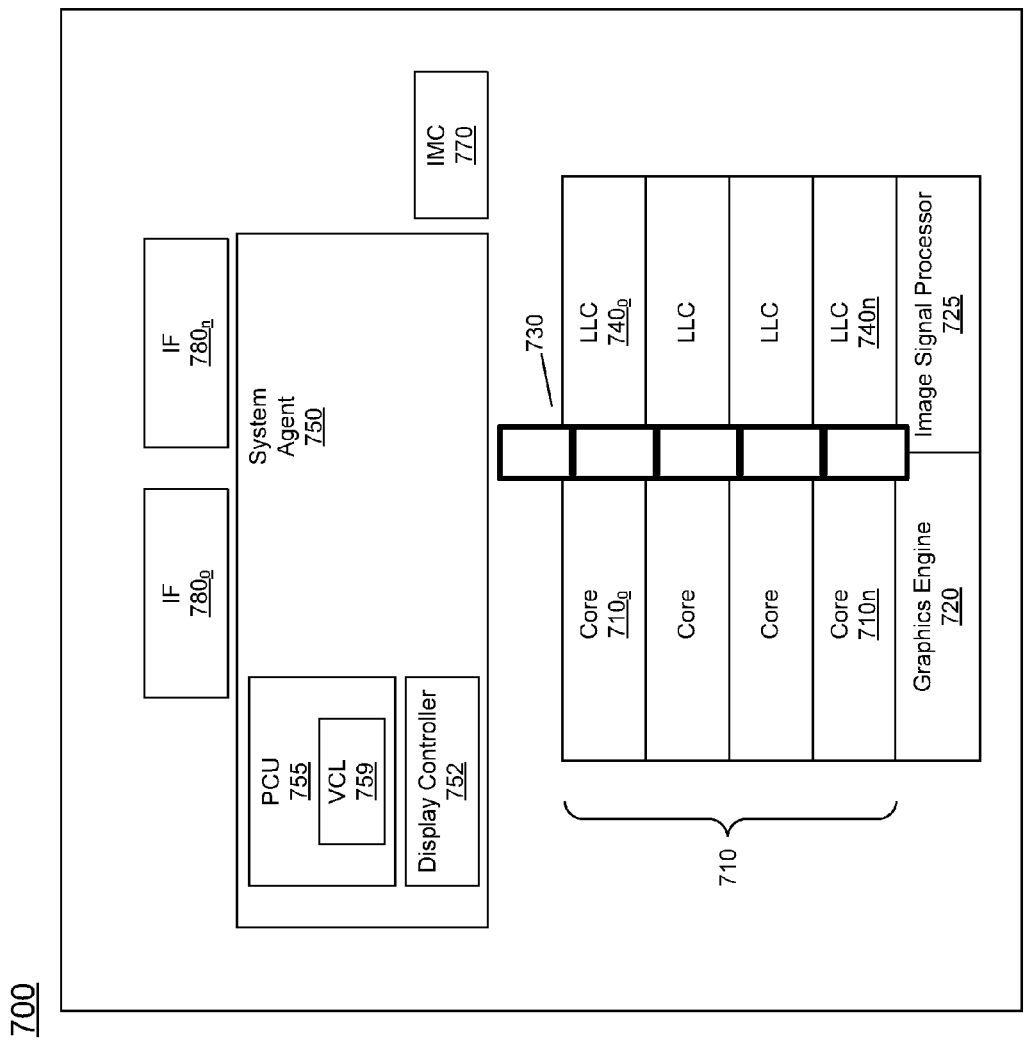
FIG. 9 is a block diagram of a multi-domain processor in accordance with another embodiment of the present invention.

Referring now to FIG. 9, shown is a block diagram of a multi-domain processor in accordance with another embodiment of the present invention. As shown in the embodiment of FIG. 9, processor 700 includes multiple domains. Specifically, a core domain 710 can include a plurality of cores $710_0$-$710_n$, a graphics domain 720 can include one or more graphics engines, and an image signal processor domain 725 may include at least one image signal processor. In addition, a system agent domain 750 may further be present. Each domain may be powered by an independent rail, in one embodiment. In another embodiment, multiple domains such as the graphics and image processing domains may be powered by a common rail, while the core domain is powered by an independent rail. In some embodiments, system agent domain 750 may execute at an independent frequency and may remain powered on at all times to handle power control events and power management such that domains 710, 720, and 725 can be controlled to dynamically enter into and exit high power and low power states. Each of domains 710, 720 and 725 may operate at different voltage and/or power. Note that while only shown with four domains, understand the scope of the present invention is not limited in this regard and additional domains can be present in other embodiments. For example, multiple core domains may be present each including at least one core.

In general, each core 710 may further include low level caches in addition to various execution units and additional processing elements. In turn, the various cores may be coupled to each other and to a shared cache memory formed of a plurality of units of a last level cache (LLC) $740_0$-$740_n$. In various embodiments, LLC 740 may be shared amongst the cores and the graphics engine, as well as various media processing circuitry. As seen, a ring interconnect 730 thus couples the cores together, and provides interconnection between the cores, graphics domain 720, signal processor domain 725 and system agent circuitry 750. In one embodiment, interconnect 730 can be part of the core domain. However in other embodiments the ring interconnect can be of its own domain.

As further seen, system agent domain 750 may include display controller 752 which may provide control of and an interface to an associated display. As further seen, system agent domain 750 may include a power control unit 755 which can include a voltage control logic 759 in accordance with an embodiment of the present invention to enable operating voltage updates to occur in a sequenced order to allow for reduced latency low power state exits as described herein. In various embodiments, this logic may be configured as in FIG. 2 and may execute the algorithms described above in FIGS. 3 and 4.

As further seen in FIG. 9, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 9, understand the scope of the present invention is not limited in this regard.

Figure 10:
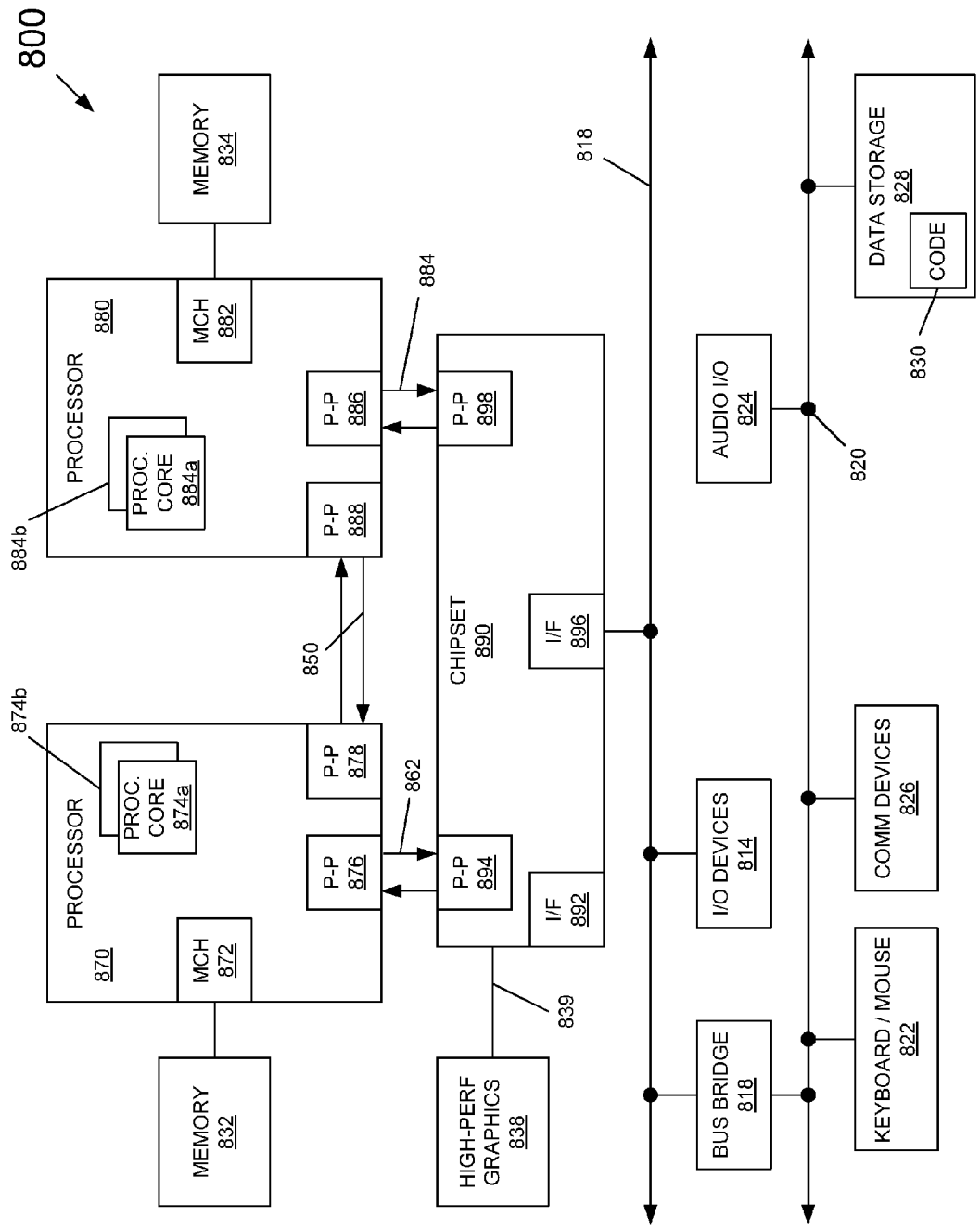
FIG. 10 is a block diagram of a system in accordance with an embodiment of the present invention.

Embodiments may be implemented in many different system types. Referring now to FIG. 10, shown is a block diagram of a system in accordance with an embodiment of the present invention. As shown in FIG. 10, multiprocessor system 800 is a point-to-point interconnect system, and includes a first processor 870 and a second processor 880 coupled via a point-to-point interconnect 850. As shown in FIG. 10, each of processors 870 and 880 may be multicore processors, including first and second processor cores (i.e., processor cores 874a and 874b and processor cores 884a and 884b), although potentially many more cores may be present in the processors. Each of the processors can include a PCU or other logic to perform dynamic operating voltage control, as described herein.

Still referring to FIG. 10, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 6, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 10, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 10, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, Ultrabook™, or so forth.

The following examples pertain to further embodiments.

In one example, a processor comprises a first domain including a plurality of processing engines, and a power controller including a first logic to receive a first request to increase an operating voltage of a first processing engine of the first domain to a second voltage, to instruct a voltage regulator to increase the operating voltage to an interim voltage, and to thereafter instruct the voltage regulator to increase the operating voltage to the second voltage.

In an example, the power controller includes a microcontroller and a dispatcher engine.

In an example, the dispatcher engine comprises a preemptible state machine.

In an example, the first logic comprises the dispatcher engine.

In an example, the dispatcher engine is to receive the first request from the microcontroller responsive to a request for the first processing engine to enter a turbo mode.

In an example, the dispatcher engine is to enable the first processing engine to enter the turbo mode responsive to receipt of an acknowledgement from the voltage regulator that the operating voltage has reached the second voltage.

In an example, the first logic is to receive a first acknowledgement from the voltage regulator that the operating voltage has reached the interim voltage, and to instruct the voltage regulator to increase the operating voltage to the second voltage responsive to the first acknowledgement.

In an example, the first logic is to receive a second request for a second processing engine of the first domain to exit a low power state, and to enable the second processing engine to exit the low power state after receipt of the first acknowledgement.

In an example, the first logic is to receive a third request for the first processing engine to enter a turbo mode, and to instruct the voltage regulator to increase the operating voltage to a third voltage greater than the second voltage.

In an example, the first logic is to enable the first processing engine to enter the turbo mode responsive to a second acknowledgement from the voltage regulator that the operating voltage has reached the third voltage.

In an example, the interim voltage comprises a voltage level sufficient to enable an additional processing engine.

Note that the above processor can be implemented using various means.

In an example, the processor comprises a system on a chip (SoC) incorporated in a user equipment touch-enabled device.

In another example, a machine-readable medium having stored thereon instructions, which if performed by a machine cause the machine to perform a method comprising receiving a frequency increase request for a first intellectual property (IP) logic of a processor, causing an operating voltage provided to the processor by a first voltage regulator to be updated from a first voltage level to an interim voltage level, and after the operating voltage reaches the interim voltage level, enabling a second IP logic of the processor to exit a low power state before enabling the first IP logic to effect the frequency increase.

In an example, the method further comprises receiving a request to wakeup the second IP logic after initiating an update to cause the operating voltage to be updated to a second voltage level, and enabling the second IP logic to wakeup before the operating voltage reaches the second voltage level.

In an example, the method further comprises causing the operating voltage to be updated to a third voltage level greater than the second voltage level.

In an example, the method further comprises after the operating voltage reaches the third voltage level, enabling the first IP logic to enter a turbo mode.

In an example, the method further comprises causing the operating voltage to be updated to the interim voltage level, responsive to a request for the first IP logic to exit the turbo mode, and causing the operating voltage to be updated to the first voltage level, after at least one of the first and second IP logics enters a low power mode.

In another example, a computer readable medium including instructions is to perform the method of any of the above examples.

In another example, an apparatus comprises means for performing the method of any one of the above examples.

In another example, a system comprises a multicore processor including a plurality of cores and a power control unit to cause an operating voltage to be updated, according to a multi-level operating voltage ramp profile, to a second level sufficient to support at least one core at a turbo mode frequency, and a dynamic random access memory (DRAM) coupled to the multicore processor.

In an example, upon completion of a first portion of the multi-level operating voltage ramp profile, the operating voltage is sufficient to support an additional core at a first frequency.

In an example, the power control unit is to allow the additional core to be enabled at the first frequency responsive to an acknowledgement that the first portion of the multi-level operating voltage ramp profile has been completed.

In an example, the power control unit is to initiate a second portion of the multi-level operating voltage ramp profile responsive to the acknowledgement to cause the operating voltage to be updated to the second level.

In an example, the power control unit is to allow the at least one core to enter the turbo mode responsive to a second acknowledgement that the second portion of the multi-level operating voltage ramp profile has been completed.

In an example, the power control unit is to cause the operating voltage to be thereafter reduced from the second level when the at least one core has exited the turbo mode, and to enable the additional core to wakeup before acknowledgement that the operating voltage has reached an interim level.

In another example, a system comprises a display and a memory, and includes the processor of one or more of the above examples.

In another example, a method comprises receiving a frequency increase request for a first intellectual property (IP) logic of a processor, causing an operating voltage provided to the processor by a first voltage regulator to be updated from a first voltage level to an interim voltage level, and after the operating voltage reaches the interim voltage level, enabling a second IP logic of the processor to exit a low power state before enabling the first IP logic to effect the frequency increase.

In an example, the method further comprises receiving a request to wakeup the second IP logic after initiating an update to cause the operating voltage to be updated to a second voltage level, and enabling the second IP logic to wakeup before the operating voltage reaches the second voltage level.

In an example, the method includes causing the operating voltage to be updated to a third voltage level is greater than the second voltage level.

In an example, after the operating voltage reaches the third voltage level, the method enables the first IP logic to enter a turbo mode.

In an example, the method further comprises causing the operating voltage to be updated to the interim voltage level, responsive to a request for the first IP logic to exit the turbo mode, and causing the operating voltage to be updated to the first voltage level, after at least one of the first and second IP logics enters a low power mode.

In an example, a communication device is arranged to perform the method of any one of the above examples.

In an example, at least one machine readable medium comprising a plurality of instructions that in response to being executed on a computing device, cause the computing device to carry out a method according to any one of the above examples.

In another example, a processor comprises a first domain including a plurality of processing engines, and a power controller including a means for receiving a first request to increase an operating voltage of a first processing engine of the first domain to a second voltage, for instructing a voltage regulator to increase the operating voltage to an interim voltage, and thereafter for instructing the voltage regulator to increase the operating voltage to the second voltage.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first domain including a plurality of processing cores; and
a power controller including a first logic to receive a first request to increase an operating voltage provided to a first processing core of the first domain to a second voltage and to increase a frequency of the first processing core, and responsive to the first request to instruct a voltage regulator to increase the operating voltage provided to the first processing core of the first domain to an interim voltage and to thereafter enable a second processing core of the first domain to exit a low power state in which the second processing core is inactive to an active state, and thereafter enable the frequency of the first processing core to be increased.

2. The processor of claim 1, wherein the power controller includes a microcontroller and a dispatcher engine.

3. The processor of claim 2, wherein the dispatcher engine comprises a pre-emptible state machine.

4. The processor of claim 3, wherein the first logic comprises the dispatcher engine.

5. The processor of claim 2, wherein the dispatcher engine is to receive the first request from the microcontroller responsive to a request for the first processing core to enter a turbo mode.

6. The processor of claim 5, wherein the dispatcher engine is to enable the first processing core to enter the turbo mode responsive to receipt of an acknowledgement from the voltage regulator that the operating voltage has reached the second voltage.

7. The processor of claim 1, wherein the first logic is to receive a first acknowledgement from the voltage regulator that the operating voltage has reached the interim voltage, and to instruct the voltage regulator to increase the operating voltage to the second voltage responsive to the first acknowledgement.

8. The processor of claim 7, wherein the first logic is to receive a second request for the second processing core of the first domain to exit the low power state, and to enable the second processing core to exit the low power state after receipt of the first acknowledgement.

9. The processor of claim 7, wherein the first logic is to receive a third request for the first processing core to enter a turbo mode, and to instruct the voltage regulator to increase the operating voltage to a third voltage greater than the second voltage.

10. The processor of claim 9, wherein the first logic is to enable the first processing core to enter the turbo mode responsive to a second acknowledgement from the voltage regulator that the operating voltage has reached the third voltage.

11. The processor of claim 1, wherein the interim voltage comprises a voltage level sufficient to enable an additional processing core.

12. A non-transitory machine-readable medium having stored thereon instructions, which if performed by a machine cause the machine to perform a method comprising:
receiving a frequency increase request for a first intellectual property (IP) logic of a processor, the first IP logic comprising a first core of the processor;
causing an operating voltage provided to the processor by a first voltage regulator coupled to the processor to be updated from a first voltage level to an interim voltage level; and
after the operating voltage reaches the interim voltage level, enabling a second IP logic of the processor comprising a second core of the processor to exit from a low power state in which the second IP logic is inactive to an active state before enabling the first IP logic to effect the frequency increase.

13. The non-transitory machine-readable medium of claim 12, wherein the method further comprises receiving a request to wakeup the second IP logic after initiating an update to cause the operating voltage to be updated to a second voltage level, and enabling the second IP logic to wakeup before the operating voltage reaches the second voltage level.

14. The non-transitory machine-readable medium of claim 13, wherein the method further comprises causing the operating voltage to be updated to a third voltage level greater than the second voltage level.

15. The non-transitory machine-readable medium of claim 14, wherein the method further comprises after the operating voltage reaches the third voltage level, enabling the first IP logic to enter a turbo mode.

16. The non-transitory machine-readable medium of claim 15, wherein the method further comprises:
causing the operating voltage to be updated to the interim voltage level, responsive to a request for the first IP logic to exit the turbo mode; and
causing the operating voltage to be updated to the first voltage level, after at least one of the first and second IP logics enters a low power mode.

* * * * *